Sept. 16, 1958

B. C. GROSSKOPF 2,851,858

FLUID COUPLING DEVICES

Filed April 21, 1955

2 Sheets-Sheet 1

INVENTOR
Bruno C. Grosskopf
BY Emery L. Groff
Atty

Sept. 16, 1958  B. C. GROSSKOPF  2,851,858
FLUID COUPLING DEVICES
Filed April 21, 1955  2 Sheets-Sheet 2
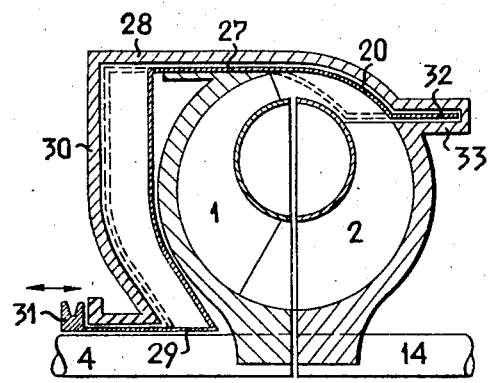
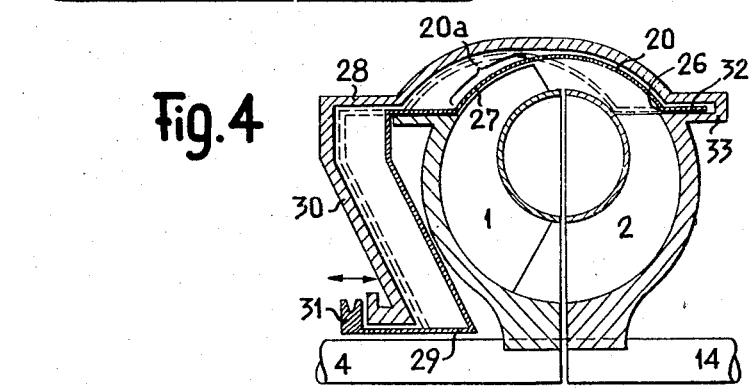
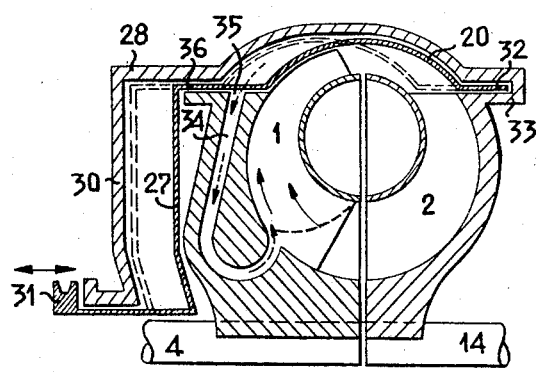
INVENTOR
Bruno C. Grosskopf
BY
Emery C. Graff
Atty.

United States Patent Office 2,851,858
Patented Sept. 16, 1958

2,851,858
FLUID COUPLING DEVICES

Bruno C. Grosskopf, Hambourg-Othmarschen, Germany, assignor to Ateliers des Charmilles S. A., Geneva, Switzerland, a corporation of Switzerland Application April 21, 1955, Serial No. 502,990

1 Claim. (Cl. 60—54)

The present invention relates to fluid coupling devices, particularly for hydraulic torque converters and change speed devices respectively, comprising at least one pump wheel and at least one turbine wheel fixed axially one relatively to the other.

Fluid coupling devices are already known which enable the transmitted torque to be adjusted by means of annular valves or baffles in the form of an annular casing for example. These annular valves or baffles act either on the direction imparted to the operating liquid between the pump wheel and the turbine wheel, or on the speed of flow, as also on the quantity of liquid in circulation.

In some cases these annular valves or baffles have the shape of a cylindrical body, located, for example, in the space existing between the pump wheel on the one hand and the guide ring on the other hand, or between the pump wheel and the turbine wheel. The adjustment of the torque transmitted is effected by axial movement of the cylindrical body, forming the annular valve or baffle.

While this method of adjustment is comparatively simple and permits of a simple construction of the hydraulic coupling device, it has considerable disadvantages. In fact, the interstice existing at the outlet of the pump is subjected to a high pressure. It results in unavoidable losses in output when a casing or adjusting slide is located at this point. There is also produced a strong thrust on the adjusting casing in the case of partial opening. On the other hand, when the adjusting casing is in a partially open position, the stream of flow of the liquid is considerably disturbed, which is naturally deleterious from a hydrodynamic point of view.

The invention tends to remedy the above mentioned disadvantages. It has for its object a hydraulic coupling which is characterized in that it comprises an external intermediate guide wall for the liquid, between the pump wheel and the turbine wheel, which guide wall is movable axially so as to enable the passage for the liquid from the pump to the turbine to be more or less constricted and thus render possible an adjustment of the torque transmitted by the coupling device.

Figure 1:
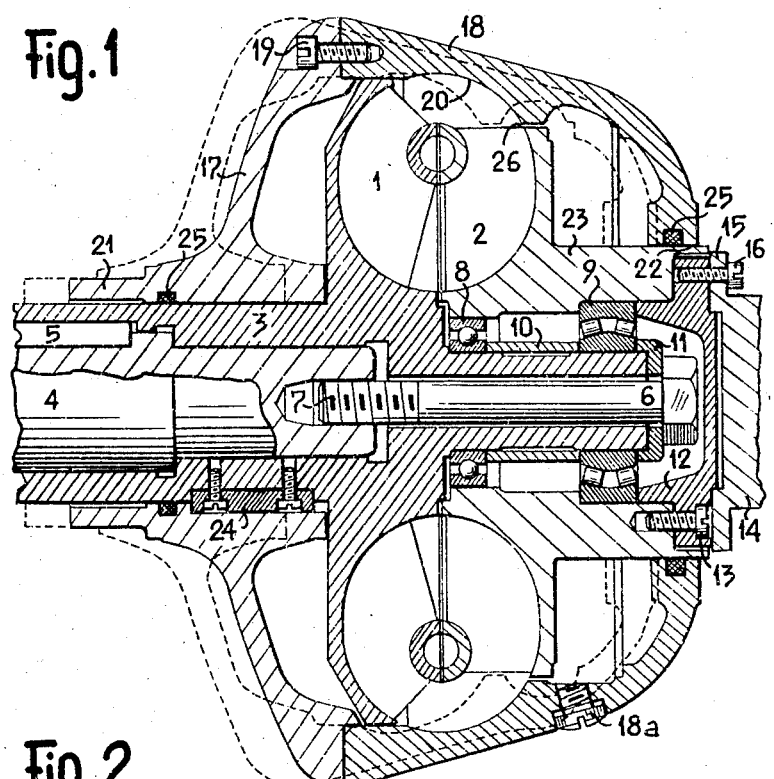
Figure 2:
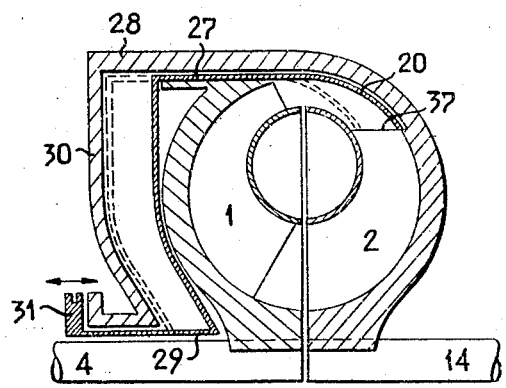

A number of forms of construction of the hydraulic coupling device according to the invention are shown by way of example in the accompanying drawings, wherein:

Fig. 1 is an axial section of a first form of construction, while Figs. 2 to 5 show four possible modified forms of construction.

With reference to Fig. 1, the hydraulic coupling device comprises a pump wheel 1 and a turbine wheel 2. The pump wheel 1 is secured to a tubular member 3, which itself is secured rigidly to a driving shaft 4, by means of a key 5 and a screw 6, which screws into a threaded bore 7 provided at the end of the driving shaft 4.

The turbine wheel 2 bears on the tubular part 3 through the medium of a ball bearing 8 and a roller bearing 9. The bearings 8 and 9, and a spacing sleeve 10, are held in position on the tubular part 3 by the screw 6, already referred to, through the medium of a washer 11. A plug 12 hides the head of the screw 6 and is secured by screws 13 to the turbine wheel 2. The driven shaft 14 is provided at its end with a flange 15 enabling it to be secured against the plug 12 by screws 16.

The outer casing of this fluid coupling device is formed by two parts 17 and 18, secured one to the other by screws 19. One part of said casing constitutes an intermediate external guide wall for the operating liquid between the pump wheel 1 and the turbine wheel 2.

The guide wall 20 is made axially movable so as to enable the passage for liquid from the pump 1 to the turbine 2 to be more or less constricted and thus to make it possible to control the torque transmitted by the fluid coupling device.

In this first form of construction, as the guide wall 20 forms an integral part of the outer casing 17, 18 of the coupling device, the outer casing 17, 18 itself is axially movable relatively to the pump and turbine wheels. 18a is a plug for closing the filling opening. On the other hand, the part 18 has an opening 22 provided for the passage of a tubular cylindrical extension 23 of the turbine wheel 2. In this case, the keys 24 secure the casing 17, 18 angularly solid with the part 3 and consequently with the pump wheel 1 and the driving shaft 4. However, said casing 17, 18 can be moved axially on the two tubular parts 3 and 23 by reason of mechanism which is not shown and is adapted to act on the extension 21 of the casing 17. Fluidtight linings 25 are provided between the part 17 and the tubular part 3, and between the part 18 and the tubular extension 23.

In the position shown in Fig. 1, the guide wall 20 enables the maximum torque to be transmitted by the coupling device. On the contrary, it will be readily understood that when the casing 17 and 18 is moved towards the left relatively to the wheels 1 and 2, the edge 26 constricts the passage of liquid from the pump to the turbine more and more. Thus, the liquid can no longer attack the blades of the turbine wheel 2 over their entire surface and the torque transmitted to the driven shaft 14 decreases. In Fig. 1 the position indicated in broken lines shows a regulating position of the guide wall 20.

It will be understood, in a modification of this first form of construction, that the casing 17, 18 should not necessarily be angularly secured to the driving shaft 4. Said casing 17, 18 may be secured angularly to the driven shaft 14 or may even be angularly independent of the shafts 4 or 14. On the other hand, the guide wall 20, instead of acting on the inlet of the passages in the turbine wheel 2, may be of such a shape that it acts on the outlet of the passages of the pump wheel 1, or even, if necessary, simultaneously on the outlet passages of the wheel 1 and the inlet passages for the liquid into the wheel 2.

In the four modified forms of construction shown in Figs. 2 to 5, the coupling device always comprises a pump wheel 1, secured to a driving shaft 4, a turbine wheel 2, secured to the driven shaft 14. However, in these modifications, the guide wall 20 forms a part of an intermediate casing 27, located between the pump wheel 1 and the turbine wheel 2 and the outer general casing 28 of the device. In the form of construction shown in Fig. 2, said outer casing 28 is secured to the turbine wheel 2. As regards the intermediate casing part 27, it is secured to a casing 29 capable of sliding axially between the driving shaft 4 and a central opening, provided in a base 30, forming part of a casing 28. The adjustment by axial movement of the wall 20 between the position shown in full lines and that shown in broken lines is effected therefore as in the first form of construction by means of a mechanism, not shown, acting on a collar 31, terminating the casing 29, at the outside of the device.

The form of construction shown in Fig. 3 is similar to the preceding one. However, in the latter, the wall 20 for guiding the working liquid is extended by a cylindrical casing 32, itself guided in a corresponding recess 33, provided in a casing 28, and the possible position of axial movement is shown in broken lines.

The form of construction shown in Fig. 4 comprises the same elements as shown in Fig. 3. However, as will be seen in this Fig. 4, the guide wall 20 extends not only over a portion of the circuit of the working liquid, located between the pump wheel 1 and the inlet into the turbine wheel 2, but also over a portion of the said circuit, included in the pump wheel 1. The part 20a of the wall 20 constitutes, to some extent, a portion of the outer wall of the passages of the pump wheel 1. Thus, when the intermediate casing 27 is moved towards the left, the edge 26 more or less closes the inlet passages of the liquid into the turbine wheel 2. However, the volume of liquid discharged by the wall 20 into the region of its edge 26 may expand in the free volume by movement towards the left of the part 20a of the said guide wall 20 up to the position indicated in broken lines.

In the last form of construction shown in Fig. 5, the device comprises the same elements as that shown in Fig. 4. However, in the latter case, the pump wheel 1 has at least a by-pass passage 34 enabling a portion of the flow of liquid to be withdrawn from its normal working circuit for directing it into this by-pass passage 34. As shown in Fig. 5, the inlet port 35 of the by-pass passage is controlled by a part 36, secured to the intermediate casing 27 and thus to the guide wall 20. The whole arrangement is such that while the passage of liquid from the pump to the turbine is restricted, the inlet passage 35 of the passage 34 is uncovered, which thus facilitates the further circulation in the by-pass passage 34. The energy transmitted by the driving shaft 4 to the turbine wheel 2 is thus reduced the more the greater the flow of liquid by-passed by the passage 34. The position of possible axial movement of the guide wall 20 is indicated by the broken lines. The edge of the blades of the wheel 1, instead of being rectilinear, may also be curved, as indicated in broken lines.

In all the forms of construction shown, the guide wall 20 has always been arranged to direct the flow of circulation of the intermediary transmission liquid into its part of the circuit the farthest removed radially from the axis of rotation of the clutch device. Further, the part of the said guide wall 20 (in the examples shown, the edge 26), adapted to produce the greatest throttling of the passage of liquid from the pump to the turbine, is located in such a manner as to operate in the region in which the distance 37, between the inner and outer contours of the corresponding (turbine) wheel, is the smallest, which permits of reducing to a minimum the amplitude of the axial movements of the said guide wall 20.

I claim:

A fluid coupling device of the closed circuit type comprising an outer casing, a fluid working medium within said casing, a pump wheel and turbine wheel positioned within said casing and including rings of pump and turbine blades, respectively, having passages for the circulation of said fluid medium in a closed circuit, said wheels being fixed axially with respect to each other, said pump wheel being the fluid driving member and said turbine wheel being the medium driven member, said outer casing being driven by said pump wheel and axially slidable therewith, and means comprising an annular blocking member for controlling the flow of said fluid working medium from the pump wheel to the turbine wheel, said means constituting a portion of said casing extendable between the outlet of said pump wheel and the inlet of said turbine wheel and being axially movable with respect to both the pump wheel and the turbine wheel, said axially movable portion extending from the inlet end of the turbine wheel blades to at least the outlet end of the pump wheel blades, the inner surface of said axially movable portion constituting a continuous fluid working medium guide wall between the outlet of the pump wheel and the inlet of the turbine wheel, whereby the passage for fluid working medium from the pump wheel to the turbine wheel may be constricted and the torque transmitted by the coupling device may be efficiently controlled by axially moving the outer casing.

References Cited in the file of this patent

UNITED STATES PATENTS

| | | |
|---|---|---|
| 1,203,265 | Radcliffe | Oct. 31, 1916 |
| 2,004,279 | Föttinger | June 11, 1935 |
| 2,251,972 | Banner | Aug. 12, 1941 |
| 2,427,458 | Jandasek | Sept. 16, 1947 |
| 2,658,346 | Seybold | Nov. 10, 1953 |
| 2,683,350 | Odman | July 13, 1954 |